(12) United States Patent
Langeder et al.

(10) Patent No.: US 7,888,618 B2
(45) Date of Patent: Feb. 15, 2011

(54) STEAM CUTTING DEVICE

(75) Inventors: Harald Langeder, Pettenbach (AT); Heribert Pauser, Grafenwörth (AT)

(73) Assignee: Fronius International GmbH, Pettenbach (AT)

( * ) Notice: Subject to any disclaimer, the term of this patent is extended or adjusted under 35 U.S.C. 154(b) by 1078 days.

(21) Appl. No.: 11/579,528

(22) PCT Filed: May 11, 2005

(86) PCT No.: PCT/AT2005/000159

§ 371 (c)(1),
(2), (4) Date: Nov. 3, 2006

(87) PCT Pub. No.: WO2005/110659

PCT Pub. Date: Nov. 24, 2005

(65) Prior Publication Data

US 2007/0215068 A1    Sep. 20, 2007

(30) Foreign Application Priority Data

May 13, 2004   (AT) ................ A 837/2004

(51) Int. Cl.
*B23K 10/00* (2006.01)

(52) U.S. Cl. ............... 219/121.39; 219/121.48; 219/497; 219/429; 219/441

(58) Field of Classification Search .......... 219/494, 219/121.39, 497, 429, 438, 441, 121.48, 219/121.52

See application file for complete search history.

(56) References Cited

U.S. PATENT DOCUMENTS 5,290,995 A    3/1994  Higgins et al.
6,326,581 B1  12/2001  Laimer et al.

FOREIGN PATENT DOCUMENTS

AT    406 559 B    11/1999
FR    2 721 917    1/1996

*Primary Examiner*—Mark H Paschall
(74) *Attorney, Agent, or Firm*—Collard & Roe, P.C.

(57) ABSTRACT

The invention relates to a steam cutting device (1), comprising at least one container (5), for a fluid (8), a current source (2), a controller (3) and a burner (6), connected to the container (5), by means of a supply line (7), for generation of a steam jet exiting through a nozzle. According to the invention, such a steam cutting device (1), in which no, or almost no fluid is found in the burner in stand-by mode or after switch-off of the steam cutting device such that post-evaporation can be avoided, may be achieved, whereby a relief line (22) is connected to the supply line (7), for relieving the supply line (7) and/or the burner (6), on or after the ending of the steam cutting process. A regulation valve (24) can be provided in the relief line, which can be connected to the controller (3) itself coupled to a sensor (25), for determining the pressure in the burner (6).

23 Claims, 6 Drawing Sheets

Fig.1

STEAM CUTTING DEVICE

CROSS REFERENCE TO RELATED APPLICATIONS

Applicants claim priority under 35 U.S.C. §119 of Austrian Application No. A 837/2004 filed May 13, 2004. Applicants also claim priority under 35 U.S.C. §365 of PCT/AT2005/000159 filed May 11, 2005. The international application under PCT article 21(2) was not published in English.

The invention relates to a steam cutting device including at least one container for a fluid, a current source, a control device and a burner connected with the container via a supply line to generate a steam jet emerging through a nozzle.

The container for the liquid, the current source and the control device are usually arranged in a basic device connected with the burner via appropriate lines.

From AT 406 559 B, a burner for a steam cutting method, which is to be connected to a control device and a supply device, is known. There, a cathode and optionally an anode, a fluid supply system and a channel extending in the region of the cathode are arranged in the burner. The channel can be connected with a supply line of the fluid supply system. The burner and the channel respectively comprise a flow channel or fluid channel or longitudinal groove. The channel extends from the anode or cathode in the direction of the supply line and is arranged between the cathode, or a cathode sleeve, and an evaporation element. The channel serves to convert the fluid into a gas. This is effected between the entry into the flow channel or fluid channel or longitudinal groove and the space between the cathode and the anode.

That burner involves the drawback that, upon completion of the steam cutting procedure, i.e., when turning off the burner or during standby operation, the pressure continues to prevail in the burner and in the supply line. This causes a post-evaporation and possibly also a fluid leakage from the burner, which may lead to important quantitative losses of the fluid required for the steam cutting operation. Moreover, the decreasing pressure in the burner and supply line entails a drop of the boiling temperature of the fluid in the burner, which will automatically result in a further conversion of the fluid into the gaseous state by the hot burner so as to cause the fluid to continue to evaporate for an undefined period of time and, subsequently—with the burner cooling down further, be reconverted into the liquid state and be able to leak out. As a result, the burner will cool down even more rapidly, thus causing a considerable delay in the restart of the steam cutting procedure. Further problems arise in that, due to the leakage of fluid from the supply line, the respective fluid supply has to be reestablished at a restart, since no, or still only a slight amount of fluid, is present in the supply line. The initially mentioned patent specification does not give any details on the fluid supply of the steam cutting device to the burner. The patent merely describes in detail the structure of the burner.

The object of the present invention, therefore, consists in providing a steam cutting device where as little fluid as possible, or no fluid at all, is present in the burner during standby operation or after having turned off the steam cutting device. Furthermore, as slight an amount of fluid as possible is to leak out of the burner upon completion of the steam cutting procedure. Finally, the fluid supply to the steam cutter is to be as independent as possible of any difference in level between the fluid container provided in the basic device and the burner.

The objects of the invention are achieved in that a relief line communicating with the supply line is provided for relieving the supply line and/or the burner at or after the completion of the steam cutting procedure.

The advantage resides in that, due to the relief line, the fluid pressure prevailing in the burner, and in the supply line of the burner, is reduced or released upon completion of the cutting process. Excess fluid still present in the burner and supply line after the completion of the cutting procedure is carried off via the relief line. The burner, and also the supply line, are thereby relieved after the termination of the steam cutting procedure such that only after the operation of the steam cutting device little or no fluid will leak out of the burner or burner nozzle. Moreover, a possible pressure increase in the burner as will, for instance, occur when using the burner on a cutting site located below the level of the container will be readily carried off via the relief line.

If the relief line is connected with the supply line within the burner or in the region of the burner, the relief in the steam cutting device will be the most effective. It is thereby ensured that the supply path from the fluid leakage site on the burner to the relief line is short and the pressure can, thus, be reduced very rapidly, with no or only a slight amount of fluid being able to leak out after the completion of the cutting process.

In an advantageous manner, the cross section of the relief line is larger than the cross section of the supply line and/or the nozzle outlet opening in the burner. This ensures a substantially accelerated relief of the burner and the supply line, since more fluid can be carried off on account of the larger cross section of the relief line.

According to a further characteristic feature of the invention, a pump for building up the fluid operating pressure required in the burner and in the supply line facing the burner is arranged in the supply line. This enables the pressure in the fluid supply system, which is necessary for the steam cutting procedure, to build up in a simple manner.

Control of the relief as a function of the steam cutting process will be feasible, if, for instance, a check valve, a control valve or a flow resistor is arranged in the relief line.

An adaptation of the pressure of the fluid to a desired operating pressure can be effected by the aid of a pressure reducer. This also enables an automatic pressure adaptation from the steam cutter in a simple and cost-effective manner. Another advantage resides in that no adjustments need be made any longer by the user, which will exclude operating errors.

When using a pump designed for the transport of fluid in either flow direction, the relief line can be formed by the supply line so as to save additional structural components like, for instance, valves etc.

If the relief line is connected with the container to allow the fluid to be recirculated into the container via the relief line during relief, no fluid will be lost and this fluid will be reusable for the subsequent cutting process.

The container may, for instance, be formed by a gas bottle or a gas cartridge, and a predefined pressure may be built up in the container. The fluid will, thus, be conducted towards the burner merely by opening a valve such that complex and expensive pumps will no longer be necessary.

By a construction comprising, in the supply line and optionally in the relief line, a nonreturn valve which will automatically open in one direction, and close in the opposite direction, at a predefined pressure, a simple, cost-saving and automatic pressure adaptation and relief of the steam cutting device will be obtained.

In an advantageous manner, the fluid is comprised of water. Hence, no expensive fluids of defined compositions are required and the user may for instance, use tap water for the cutting process.

In order to prevent a calcification and contamination of the fluid supply system and burner in a manner as simple and cost-effective as possible, a further characteristic feature of the invention provides a filter for cleaning the fluid, which is preferably arranged in the container and/or in the supply line and/or in the relief line and/or in a refill container.

If a sensor for detecting the pressure in the burner and/or in the supply line and/or in the relief line is provided, the respective values can be transmitted to the control device to set up a control circuit. Instead of the pressure, or in addition to the pressure, it is also feasible to detect the fluid flow rate by the aid of a sensor. The control device connected with the sensor is connected with the pump and/or the control valve and/or the check valve and/or the flow resistor and/or the pressure reducer to set up a control circuit for a pressure-dependent control. Thus, the automatic adaptation to the required values is enabled in a simple manner. Another advantage resides in that it offers the user the option to carry out a pressure adjustment for the fluid supply in order to adapt the pressure to the respective conditions.

The steam cutting device will be usable for a substantially longer period of time without cleaning, if an evaporator is installed in the supply line. The operating period or time of use will then be substantially extended.

If a means for detecting and processing the operating parameters of the steam cutting device is provided, the pressure in the burner and in the supply line can also be detected and calculated via the operating parameters of the steam cutting device without using a pressure sensor. Hence, it will merely do to program and store a calculation routine in the steam cutting device. The steam cutting device will then be able to automatically respond via the detected and calculated values and, hence, provide a simple and cost-effective control.

The present invention will be explained in more detail by way of the annexed drawings. Therein.

Figure 1:
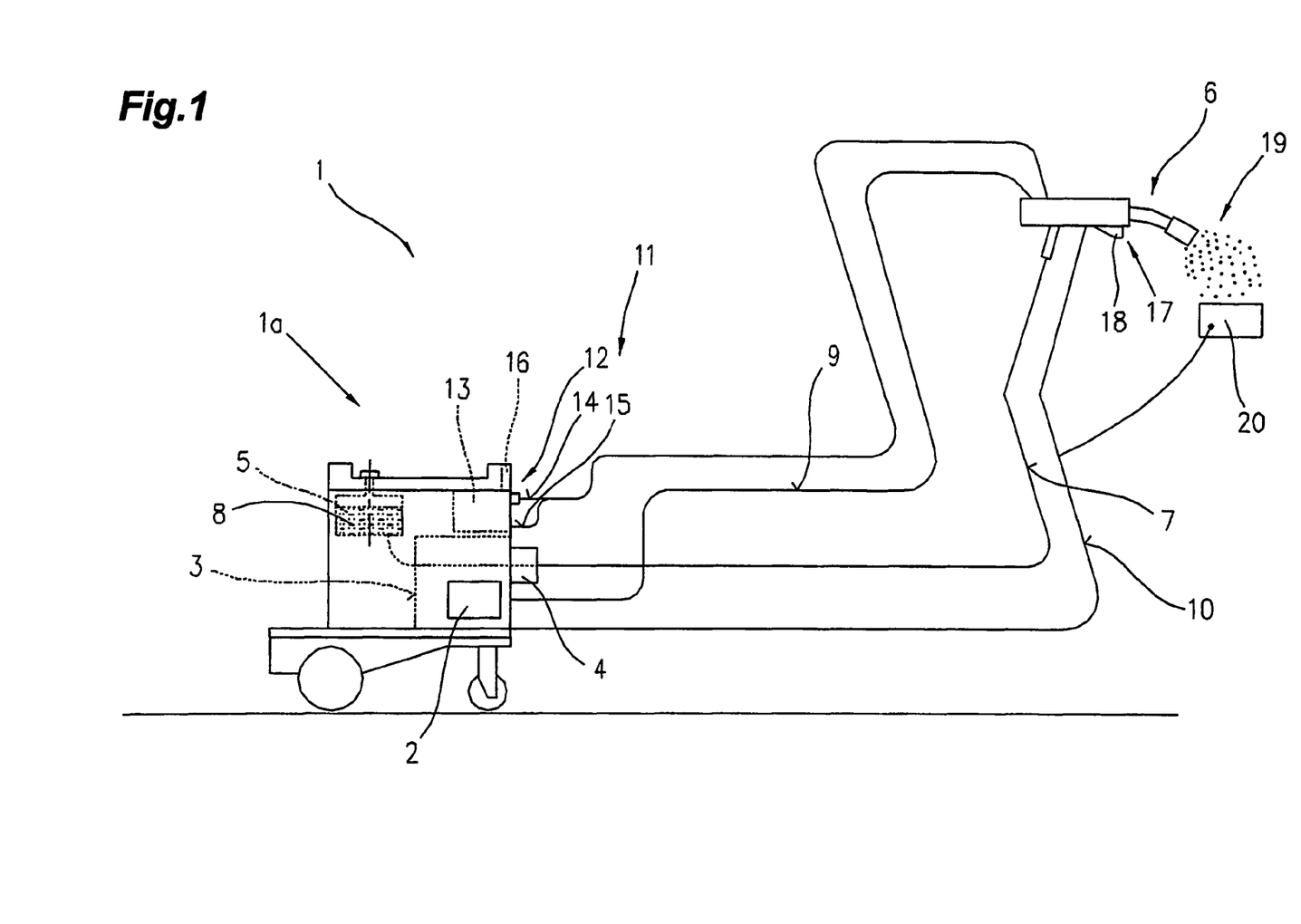
FIG. 1 is a schematic illustration of a steam cutting device.

FIG. 1 depicts a steam cutting device 1 comprising a basic device 1a for a steam cutting procedure. The basic device 1a comprises a current source 2, a control device 3 and a blocking element 4 associated with the control device 3. The blocking element 4 is connected with a container 5 and a burner 6 via a supply line 7 in a manner that the burner 6 can be supplied with a fluid 8 provided in the container 5. The supply of the burner 6 with energy, in particular current and voltage, takes place from the current source 2 via lines 9, 10.

To provide cooling of the burner 6, the latter is connected with a fluid container 13 via a cooling cycle 11, optionally via an interposed flow monitor 12. When putting the burner 6, or basic device 1a, into operation, the cooling cycle 11 will be started by the control device 3, thus providing cooling of the burner 6 via the cooling cycle 11. To form the cooling cycle 11, the burner 6 is connected with the fluid container 13 via cooling lines 14, 15.

Moreover, the basic device 1a comprises an input and/or display device 16 to enable the adjustment of the various parameters or operating states of the steam cutting device 1. The parameters adjusted via the input and/or display device 16 are transmitted to the control device 3 so as to enable the control device 3 to control the individual components of the steam cutting device 1.

It is, of course, not necessary to connect the burner 6 with the basic device 1a via individual lines 7, 9, 10, 14, 15 as illustrated in the exemplary embodiment, but the individual lines 7, 9, 10, 14, 15 can also be combined in a common hose pack (not illustrated), which is connected to the burner 6 and the basic device 1a by the aid of a coupling means and, in particular, connection plugs.

Furthermore, the burner 6 may comprise at least one operating element 17 and, in particular, a push-button switch 18. Via the operating element 17 and, in particular, push-button switch 18, the operator, by activating and/or deactivating the push-button switch 18, is able to inform the control device 3 from the burner 6 on that a steam cutting procedure is to be started and performed. Moreover, the input and/or display device 16, for instance, serves to make preadjustments and, in particular, predefine the material to be cut, the employed fluid and, for instance, current and voltage characteristics. It goes without saying that further operating elements may be arranged on the burner 6 to adjust one or several operating parameters of the steam cutting device 1 from the burner 6. To this end, such operating elements can be connected with the basic device 1a, in particular control device 3, directly via lines or via a bus system.

Upon actuation of the push-button switch 18, the control device 3 will activate the individual components required for the steam cutting procedure. A pump (not illustrated), the blocking element 4 as well as the current source 2 are, for instance, activated first to start the supply of fluid 8 and electric energy to the burner 6. After this, the control device 3 activates the cooling cycle 11 to enable cooling of the burner 6. By supplying fluid 8 and energy, in particular current and voltage, to the burner 6, the fluid 8 will be converted into a high-temperature gas 19, in particular plasma, in the burner 6 to enable the execution of a cutting process on the workpiece 20 by gas 19 flowing out of the burner 6. The exact mechanism for the conversion of the fluid 8 into the gas 19 can be taken from applicant's AT 405 559 B.

FIGS. 2 to 11 depict schematic illustrations of steam cutting devices 1 according to the invention, including fluid recirculations 21 to relieve the steam cutting device 1 after a steam cutting procedure.

The fluid 8 is fed to the burner 6 from the container 5 via the supply line 7 by the aid of at least one pump 23. The fluid 8 evaporates in the burner 6, with a gas jet or gas 19 emerging from the burner 6 at a high temperature. The pump 23 may be of any construction known from the prior art and will be schematically illustrated in a simplified manner in the following FIGS. 2 to 11. Via said at least one pump 23, the operating pressure required for the steam cutting procedure is built up in the burner 6 and in the supply line side facing the burner 6.

Figure 2:
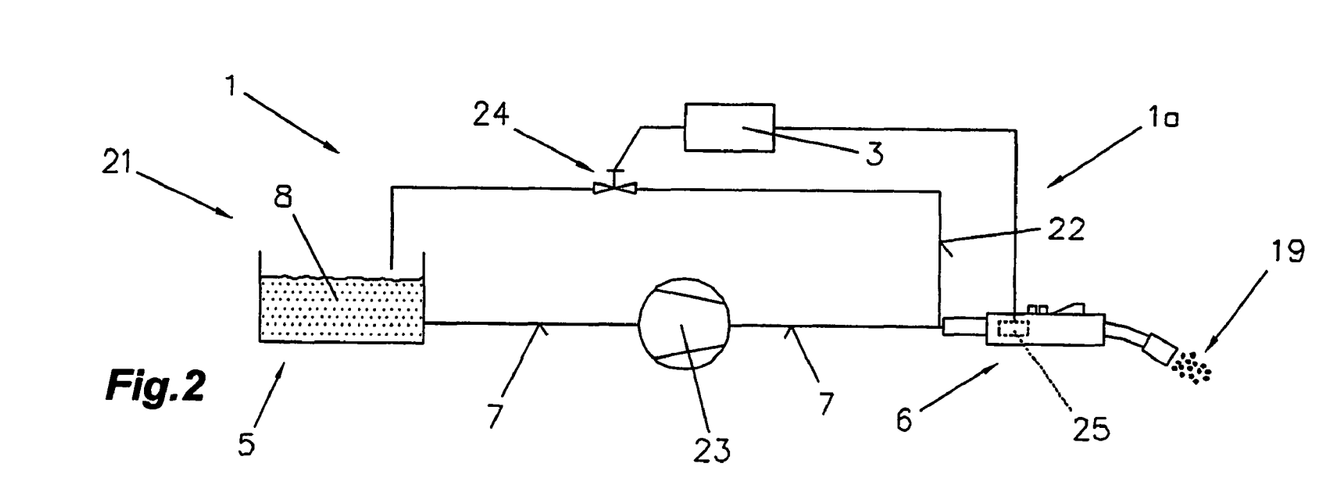
FIGS. 2 to 11 are schematic illustrations of various embodiments of steam cutting devices according to the invention including fluid recirculations.

After having completed the steam cutting procedure, the pressure for the fluid supply continues to build up in the burner 6 and the supply line 7, particularly on the pressure side of the supply line 7, even with the pump 23 deactivated. This is due to the fact that the supply line 7 is expanded by the pressure built up during the cutting procedure and reassumes its original state after the completion of the cutting process or fluid transport, thus pressing the fluid 8 present in the supply line 7 into the burner 6. The burner 6 is, thus, supplied with fluid 8 present in the supply line 7 for a short period of time upon termination of the cutting process, even without new fluid 8 being supplied from the container 5. In addition, a gas cushion has formed in the burner 6, which is to be relieved.

The pressure or gas cushion present in the burner 6 can only be relieved via the nozzle of the burner 6. Due to the small cross section of the nozzle outlet opening, it will take a relatively long time for the pressure to decrease, which will result in a long post-evaporation. In this respect, it should be noted that the boiling temperature of a fluid 8 increases at an elevated pressure and drops with the pressure decreasing, which means that the pressure in the supply line 7 and burner 6, after the completion of the cutting process, will automatically be reduced by escaping gas such that the partially overheated fluid 8 will continue to boil and evaporate, with the vapor or gas 9 continuing to escape from the burner 6, i.e., post-evaporating so to say.

A substantial disadvantage of post-evaporation resides in that the burner 6 is thereby substantially more rapidly cooled, whereby, for instance during standby operation, the burner 6 will cool down to such an extent as to require reheating at a new start of the burner 6, which will result in substantially longer starting phases.

In order to prevent or reduce such a post-evaporation, the fluid 8 which is under pressure in the burner 6 and supply line 7, upon completion of the steam cutting procedure, is relieved and the pressure decreased via a relief line 22. Advantageously, the relief line 22 is connected with the supply line 7 in or near the burner 6. The relief line 22 is decoupled relative to the supply line 7 by a blocking member arranged in the relief line 22 in order to prevent pressure from building up in the relief line 22 during the supply of fluid to a cutting process. The pressure relief takes place in that the relief line 22 is not under pressure such that, during the activation of the blocking member, which is automatically effected at the termination of the cutting process, the pressure in the supply line 7 and in the burner 6 decreases into the relief line 22. This causes the fluid 8 to be virtually sucked into the relief line from the supply line 22 and the burner 6 such that no or only an insignificant post-evaporation will occur. Such an insignificant post-evaporation causes the burner 6 to be less strongly cooled such that, at a restart, i.e. after short cutting interruptions, more rapid heating of the burner 6 and, hence, more rapid heating of the fluid 8 to boiling temperature will be ensured. Substantially less energy is, thus, required than would be for reheating the burner 6. Naturally, it is also possible to maintain the temperature of the burner 6 during standby operation by the aid of heating elements (not illustrated) arranged in the burner 6.

The relief line 22 is, for instance, connected with the supply line 7 between the pump 23 and the burner 6. The cross section of the relief line 22 is advantageously larger than the cross section of the nozzle outlet opening and/or supple line 7 in order to ensure a faster pressure decrease in the burner 6 and in the supply line 7. The relief line 22 may, of course, also have a cross section identical with, or smaller than, that of the nozzle outlet opening and/or supply line 7, in which case the pressure will, however, decrease more slowly. In addition, a control valve 24 is arranged in the relief line 22 such that, at an activation of the control valve 24, i.e. after the completion of the steam cutting procedure, the pressure in the supply line 7 and in the burner 6 will be relieved via the relief line 22.

The relief line 22 is connected with the supply line 7 as closely to the burner 6 as possible, or in the burner 6. The relief line 22 leads from the supply line 7 to the container 5 into which the fluid 8 is recirculated. In this case, the fluid 8 in the container 5 is not pressurized. Since the fluid 8 in the container 5 is provided to the pump 23 in a pressureless manner, i.e. in the uncompressed state, the recirculation of the fluid 8 from the relief line 22 to the container 5 is feasible without any problem. The relief line 22 comprises a control valve 24, which is controlled by the control device 3 during the steam cutting procedure.

Moreover, a sensor 25, for instance a pressure and/or flow sensor, for the fluid supply may be arranged between the burner 6 and the relief line 22, preferably in the burner 6 or also in the feed line 7 and/or in the relief line 22. The sensor 25 transmits the detected data and values, i.e. the current pressure and/or flow rate values, to the control device 3 so as to enable the latter to accordingly activate the individual components. When starting a cutting process, the control valve 24 is closed so as to enable the pressure of the fluid 8 to build up in the supply line 7 via the pump 23. At the same time, the burner 6 is heated by being powered with energy, so that the supplied fluid 8 will be transformed into the gaseous state while an accordingly hot plasma jet is being formed for the cutting process. The sensor 25 monitors the pressure in the supply line 7 in order to enable the control device 3 to trigger the respective control procedures at pressure fluctuations. If, for instance, too high a pressure occurs in the supply line 7, the control valve 24 arranged in the relief line 22 will be opened by the control device 3 to allow the pressure of the fluid to be relieved via the relief line 22. If, during the steam cutting procedure, the sensor 25 recognizes that the predetermined pressure has again been reached, the control device 3 will reclose the control valve 25. The pressure balance in the supply line 7 and in the burner 6 is, thus, controlled via the control valve 24, with the fluid 8 being recirculated to the container 5. When finishing the cutting procedure, the control valve 25 is reopened such that the pressure of the fluid 8 will be relieved via the relief line 22 and the fluid 8 will, at the same time, be recirculated from the supply line 7 and the burner 6 into the container 5.

Naturally, it is also possible to calculate the pressure of the fluid 8 in the burner 6 and in the supply line 7 by the aid of operating parameters like, e.g., current, voltage and time, which are continuously determined during the steam cutting procedure. Hence, it will do to deposit but one variant or program in the memory of the steam cutter 1 or control device 3. As a result, it is, for instance, feasible to save the sensor 25 and accordingly reduce the costs. A steam cutting device 1 of simple construction, which ensures the relief of the burner 6 and the supply line 7 after the steam cutting procedure, is thus realized.

The container 5 may, for instance, be formed by a gas bottle. For steam cutting procedures requiring little amounts of fluid 8, a portable, autonomous steam cutter 1 with an extended operating time will, thus, be created. The container 5 can, for instance, be exchangeably arranged in the steam cutting device 1. Besides, the burner 6 according to the invention, or steam cutting device 1, is not bound to any place or lines such that the burner 6, or steam cutting device 1, can at any time be used for steam cutting on locations difficult to accede, i.e. places of use that are difficult to reach.

Figure 3:
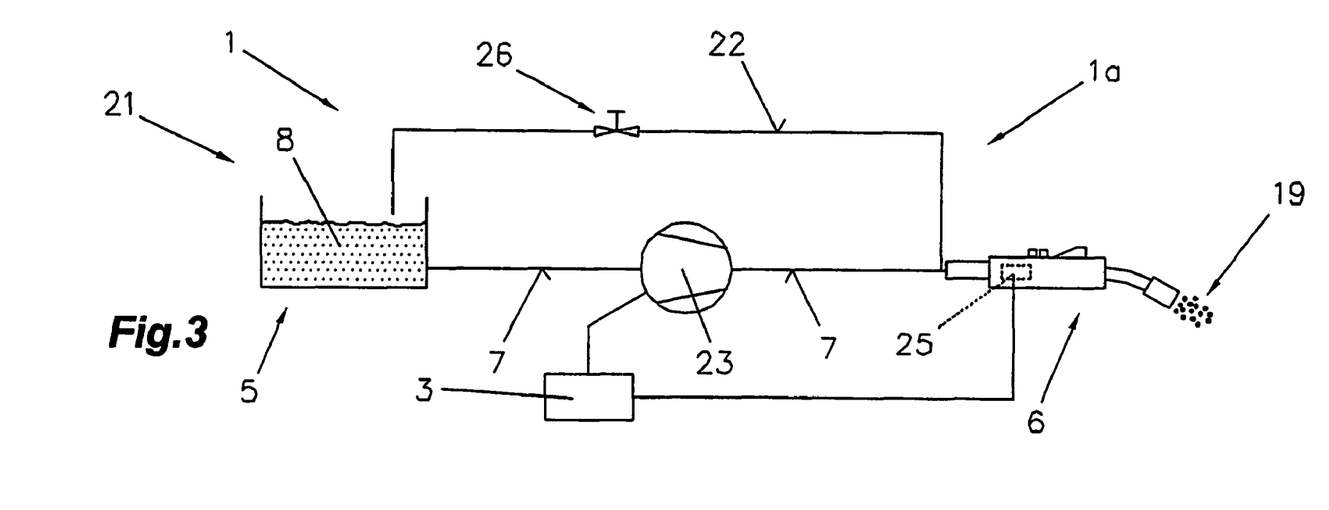

FIG. 3 is a schematic illustration of a further exemplary embodiment of the steam cutting device 1 according to the invention. A container 5 is again provided for the fluid 8, from which the fluid 8 is delivered to the burner 6 via the supply line 7 by the aid of a pump 23. To relieve the burner 6, a check valve 26 is in this embodiment arranged in the relief line 22, which check valve is activated after the steam cutting procedure for pressure relief of the supply line 7. The pump 23 in this exemplary embodiment is connected with the control device 3 such that the pump 23 can be controlled as a function of the fluid pressure detected by the sensor 25. By contrast, the pressure control in the example according to FIG. 2 is effected via the control valve 24. The sensor 25 in the burner 6 transmits the pressure values or actual values to the control device 3. The pressure balance in the supply line 7 and in the burner 6 is controlled via the pump 23. By controlling the pump 23, an adaptation of the pressure in the supply line 7 and in the burner 6 is effected. If, for instance, the pressure in the supply line 7 and in the burner 6 increases, this will be recognized by the sensor 25 and transmitted to the control device 3. As a result, the number of revolutions and/or the flow rate of the pump 23 will be reduced by the control device 3. If, on the other hand, the value of the sensor 25 drops, the number of revolutions or flow rate of the pump 23 will be increased by the control device 3. Thus, a continuous adaptation of the number or revolutions or flow rate of the pump 23 as a function of the pressure is being performed until the actual value corresponds with the adjusted or deposited set value for the pressure. When terminating the cutting process, the check valve 26 is activated by the control device 3 such that a pressure decrease will take place via the pressureless relief line 22 and the fluid 8 will be conveyed back into the container 5.

Hence, a simple and compact structure of the steam cutting device 1 is again provided, which enables the realization of a portable steam cutting device 1 to be also employed on places of use that are difficult to accede.

Figure 4:
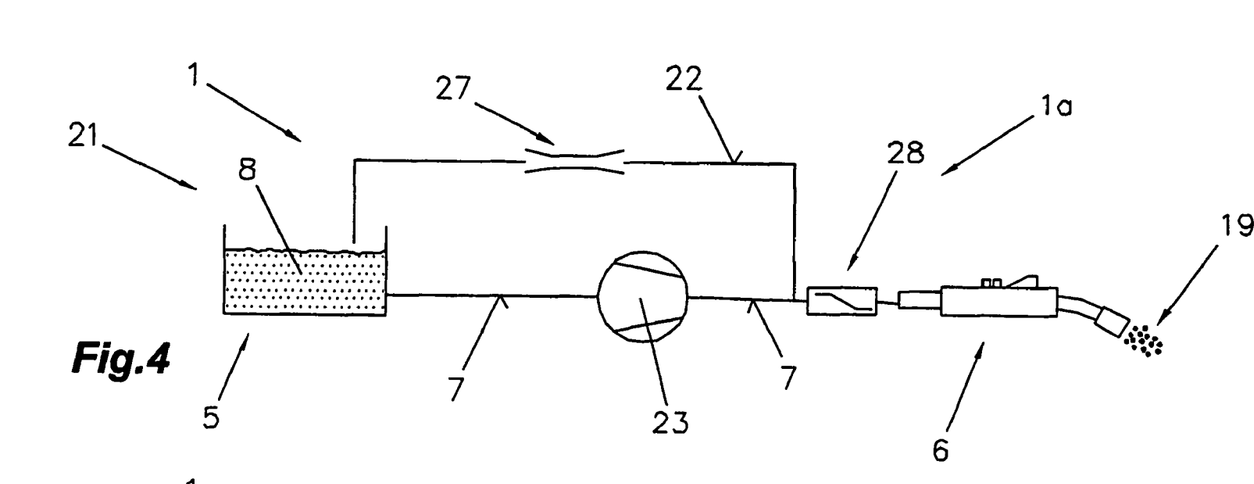

According to FIG. 4, the check valve 26 may be replaced with a flow resistor 27 arranged in the relief line 22 to enable pressure relief of the supply line 7 and of the burner 6. It is, of course, also possible to arrange a pressure reducer 28 known from the prior art upstream of or in the burner 6 in addition to the flow resistor 27 in order to enable the use of a simple and cost-effective pump 23. No control of the pump 23 is required in this case, since the pressure in the burner 6 is controlled via the pressure reducer 28. It is, of course, also possible in this exemplary embodiment to provide a sensor 25 and control the pressure balance via the pump 23 without a pressure reducer 28. In order to ensure the safe relief of the steam cutting device 1 in this exemplary embodiment, the flow resistor 27 may, of course, be replaced with a control valve 24 or a simple check valve 26.

Figure 5:
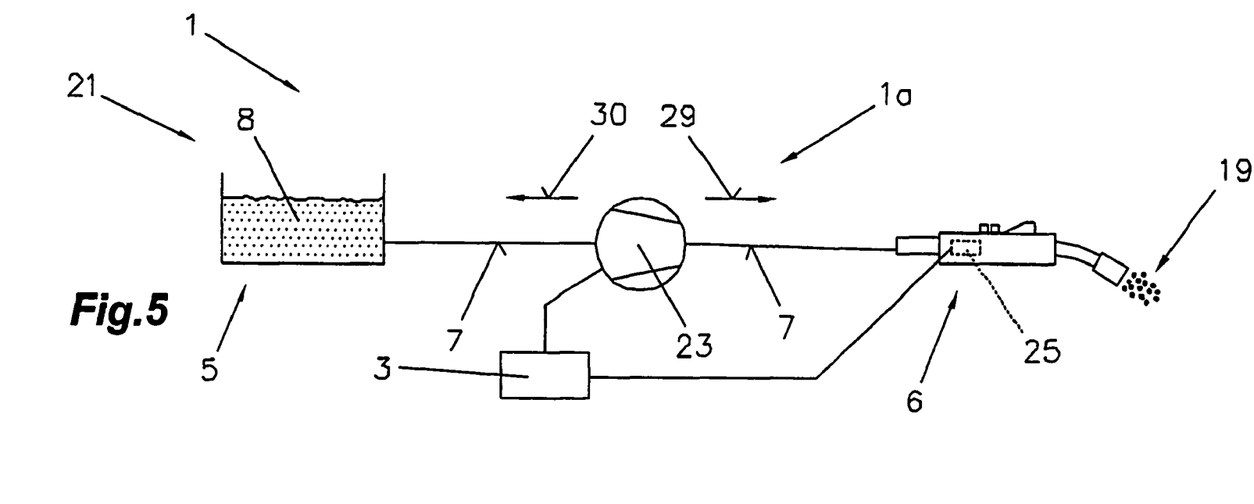

According to FIG. 5, it is further feasible to ensure the relief of the supply line 7 and of the burner 6 merely by the pump 23. In doing so, the pump 23 is controlled by the control device 3 on grounds of the data detected by the sensor 25. Thus, when starting the steam cutting process, the pump 23 delivers the fluid 8 from the container 5 to the burner 6 in the sense of arrow 29. At or after the termination of the steam cutting process, the pump 23 delivers the fluid 8 back into the container 5 in the sense of arrow 30. This is accomplished by the pressure prevailing in the supply line 7 and in the burner 6, with a relief of the supply line 7 and of the burner 6 taking place. In this case, the pump 23 must, however, be reversible in its delivery direction, i.e. usable in either flow direction, i.e. along arrow 29 in the direction of the burner 6 and along arrow 30 in the opposite direction. In this exemplary embodiment, no relief line 22 need be provided, since the fluid 8 is conveyed to and from the burner 6 merely via the pump 23. Yet, it goes without saying that a relief line 22 may be additionally arranged to achieve an even faster relief of the supply line 7.

Figure 6:
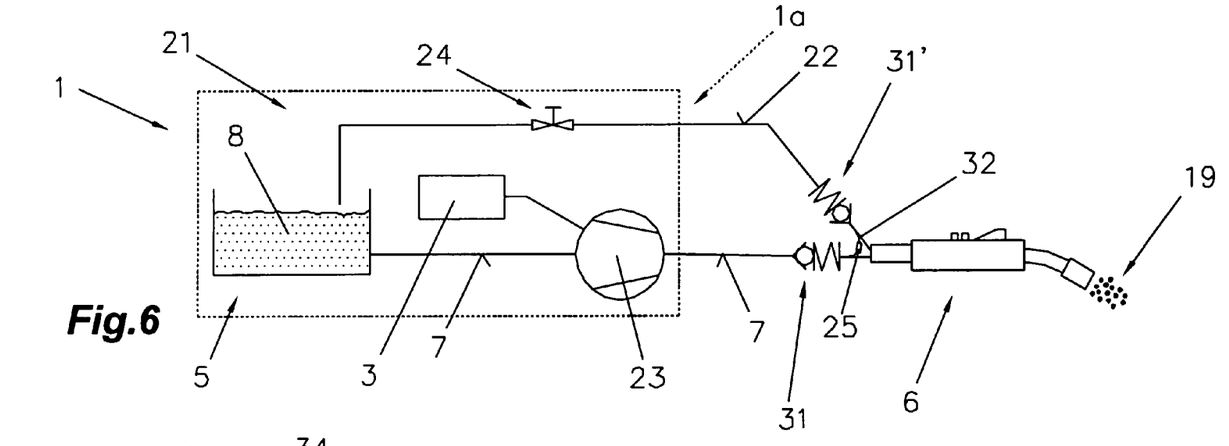

FIG. 6 depicts a further variant embodiment of the steam cutting device 1 according to the invention, wherein at least one nonreturn valve 31, 31' known from the prior art is used in the supply line 7 and in the relief line 22, respectively. In this case, the relief line 22 in the burner 6 is connected with the gas generation chamber or channel for transforming the fluid 8 into the gaseous state (not illustrated).

The nonreturn valve 31 is arranged immediately upstream of the burner 6 in the supply line 7 such that the flow direction of the nonreturn valve 31 points in the direction of the burner 6. The nonreturn valve 31 preferably opens at a pressure of from 0.01 bar to 10 bar, in particular 1 bar, thus providing the burner 6 with fluid 8.

After the completion of the steam cutting procedure, the steam cutting device 1 is, however, still under pressure. To relieve the steam cutting device 1 and the burner 6, a relief line 22 is again provided in this exemplary embodiment. In the relief line 22, a further nonreturn valve 31' is arranged in the region of the burner 6, the flow direction of the nonreturn valve 31' in this case leading away from the burner 6, i.e. into the direction of the fluid container 5. The further nonreturn valve 31' arranged in the relief line 22 preferably opens at a pressure of from 1 mbar to 1000 mbar and, in particular, at a pressure of 50 mbar. In the relief line 22 is further arranged a control valve 24, which is opened by the control device 3 upon termination of the steam cutting process so as to cause the nonreturn valve 31' of the relief line 22 to be opened due to a higher pressure prevailing in the burner 6, thus relieving the supply line 7. The relief line 22 is connected with the supply line 7 via a further line 32, in which further line 32 the sensor 25 is arranged. The burner 6 may, of course, also be supplied, for instance, via a branch line branching off the supply line 7 and the relief line 22.

A substantial advantage of this configuration results from that the steam cutting device 1, along with the fluid recirculation 21, can be applied irrespectively of the level of application, i.e. the difference in level between the container 5 and the burner 6, since the respectively required pressure for the steam cutting process will prevail within the supply line 7 due to the nonreturn valve 31. The fluid 8 is, thus, provided to the burner 6 at the appropriate pressure. In addition, the safe relief of the supply line 7 is likewise ensured in a manner independent of the level of application of the steam cutting device 1 on account of the nonreturn valve 31' opening at a slight pressure in the relief line 22.

Another advantage results from that the fluid 8 is returned into the container 5 by the relief line 22, since the container 5 is not pressurized and the excess fluid 8 present in the supply line 7 can be reintroduced into the container 5 without any problem. It is thereby ensured that no fluid 8 will be lost when relieving the burner 6 and the supply line 7, respectively. It is, moreover, advantageous that the fluid 8, after the termination of the steam cutting process, will be present under a particular pressure in the supply line 7 as far as to the nonreturn valve 31. At a restart of the steam cutting process, less fluid 8 will then have to be pumped into the supply line 7, or less pressure be built up in the supply line 7. This enables a quicker restart of the steam cutting procedure.

It should basically be noted that the container 5 is not under a predefined pressure in the previously described variant embodiments.

Figure 7:
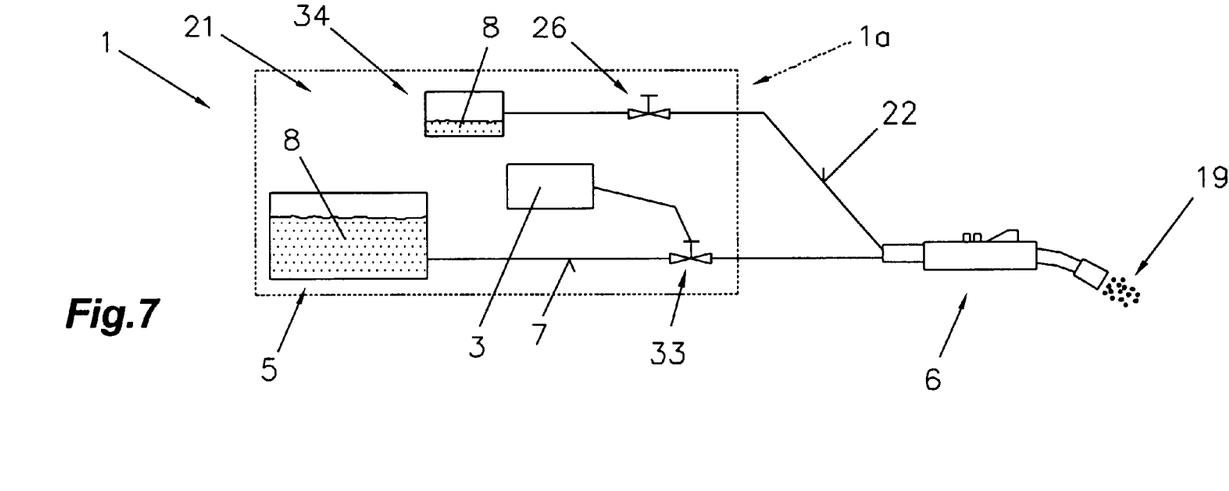

Another exemplary embodiment of the steam cutting device 1 including the fluid recirculation 21 according to the invention is schematically illustrated in FIG. 7. There, a predefined pressure prevails in the container 5 in a manner similar to a gas bottle. Preferably, the pressure required for the steam cutting procedure prevails in the container 5. In the supply line 7 provided on the container 5 is arranged a main valve 33 which is controlled by the control device 3, opening merely at the start of the steam cutting procedure and closing again upon termination of the same. Due to the pressure prevailing in the container 5, the fluid 8 is pressed in the direction of the burner 6, thus realizing in a simple manner the fluid supply of the burner 6 without a pump 23.

In order to enable the relief of the supply line 7 and the burner 6, a relief line 22 is again arranged on the supply line 7. It is, of course, also feasible to arrange the relief line 22 directly on or in the burner 6. In the relief line 22 is provided a check valve 26 which opens after the termination of the steam cutting procedure, while the main valve 33 arranged in the supply line 7 is being closed. The excess fluid 8 under pressure is preferably conducted into a further container 34 via the relief line 22. Said further container 34 is preferably exchangeably arranged in the basic device 1a so as to enable the user to simply dispose of, or reuse, the fluid 8.

Figure 8:
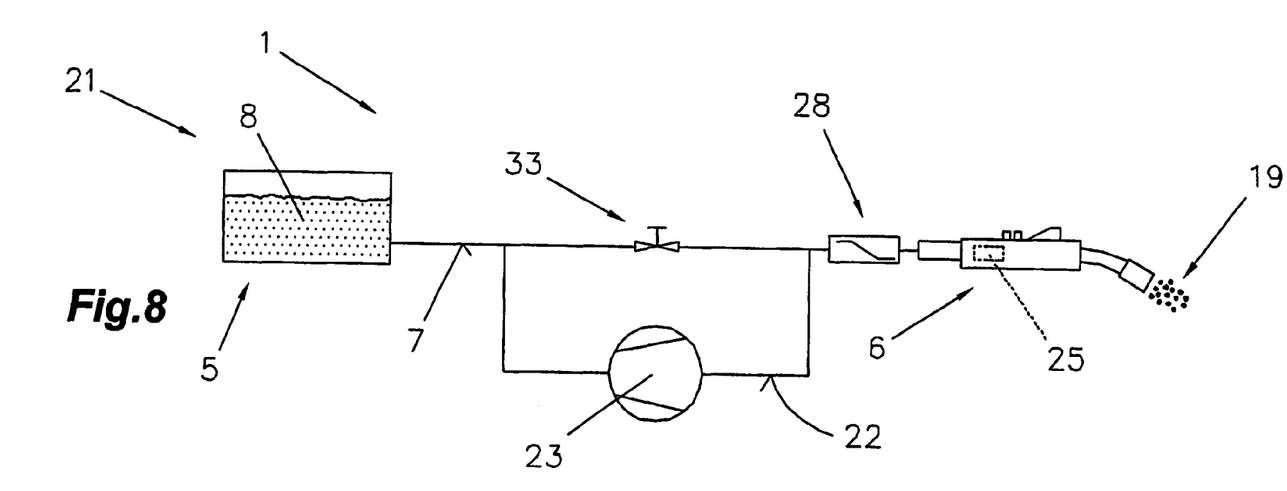

A predefined pressure also prevails in the fluid container 5 in the variant embodiment according to FIG. 8. The main valve 33 is again arranged in the supply line 7 provided on the container 5, opening at the start of the steam cutting procedure so as to cause the fluid 8 to be supplied to the burner 6. The pressure prevailing in the container is, however, larger than the pressure required in the burner 6 to perform the steam cutting procedure, for which reason a pressure reducer 28 is arranged upstream of the burner 6 to adapt the pressure accordingly.

For relief in the burner 6 and in the supply line 7, a relief line 22 is again arranged between the pressure reducer 28 and the main valve 33, running again into the supply line 7 between the main valve 33 and the container 5. In the relief line 22, a pump 23 is arranged, whose delivery direction is oriented towards the container 5. Upon termination of the steam cutting procedure, i.e. with the main valve 33 closed, the fluid 8 is delivered back into the container 5 via the relief line 22 by the aid of the pump 23.

It is, of course, also possible to arrange a sensor 25, for instance, in the burner 6 in order to detect the actual pressure values and be able to respond accordingly. The pressure reducer 28 is controlled as a function of the pressure measured by the sensor 25 with a view to consistently supplying the burner 6 with a constant pressure, or the pressure required for the steam cutting procedure.

Figure 9:
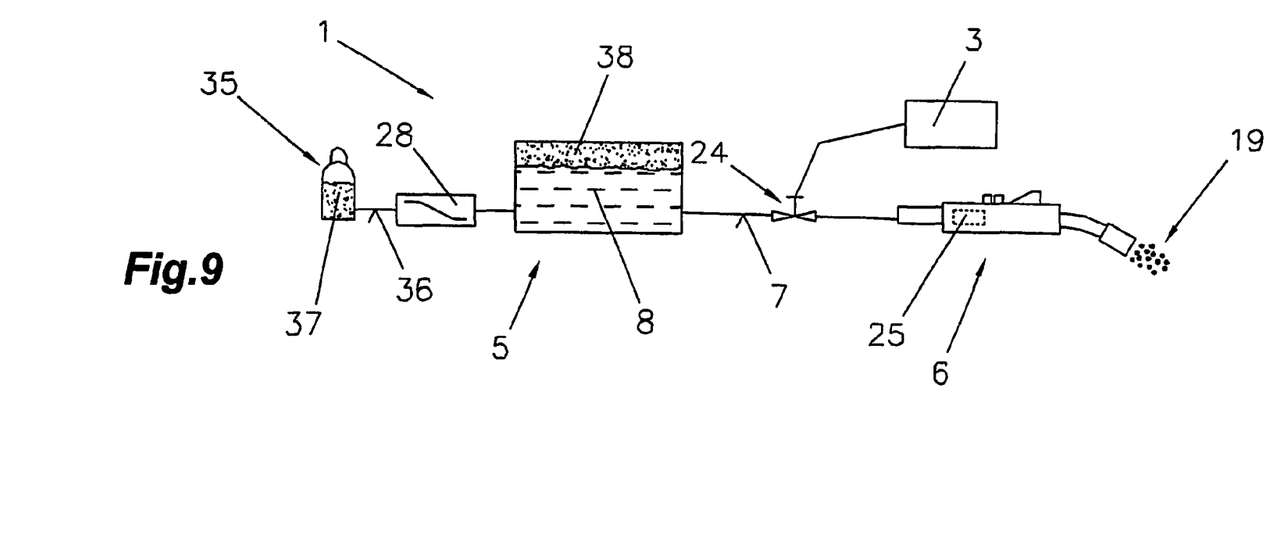

It is, of course, also possible to replace the container 5 with a pressure container 35 as in accordance with FIG. 9. In the pressure container 35, which may be formed by a gas bottle or gas cartridge, a predefined pressure prevails. The pressure container 35 is connected via a gas line 36 with the container 5 containing the fluid 8 for the steam cutting procedure. The supply line 7 via which the fluid 8 is supplied to the burner 6 is arranged on the side of the container 5 located opposite the pressure container 35.

In order to generate the pressure required for the steam cutting procedure in the steam cutting device 1, and in the burner 6 and supply line 7, respectively, a gas 37 contained in the pressure container 35 is pressed into the container 5. This causes the production of a gas cushion 38 in the container 5, which presses the fluid 8 in the direction of the burner 6 at the necessary pressure. The control valve 24 controlled by the control device 3 is arranged between the container 5 and the burner 6 and is opened after the pressure build-up in the container 5 following the start of the steam cutting procedure. In order to control the pressure of the gas cushion 38 in the container 5, a pressure reducer 28 may, for instance, be arranged between the pressure container 35 and the container 5. The pressure reducer 28 can also be controlled by the control device 3. It is, moreover, feasible to arrange a sensor 25 in the gas line 36 and/or in the container 5 and/or in the supply line 7 and/or in the burner 6. The control device 3 is, thus, able to control the pressure reducer 28 and the control valve 24 on grounds of the pressure values detected by the sensor 25.

Consequently, the pump 23 may be replaced with a control valve 24, which will, of course, provide huge cost savings. With such a configuration, however, the pressure in the pressure container 35 decreases during the steam cutting procedure, i.e. at a fluid reduction in the pressure container 35, particularly when almost all of the fluid has been withdrawn from the pressure container 35. Since, however, the pressure in the pressure container 35 is substantially higher than the pressure required for the steam cutting procedure, the pressure conditions are easy to adapt to the actually required pressure, for instance, via the sensor 25 and the control device 3.

This variant embodiment, however, involves the disadvantage that no relief of the burner 6 and the supply line 7 will occur after the end of the steam cutting procedure. In order to enable such a relief, a relief line 22 which conducts the withdrawn fluid 8 into a further container 5 may again be employed. The steam cutting device 1 comprising the fluid recirculation according to the invention would, thus, again be realized in a simple manner.

Figure 10:
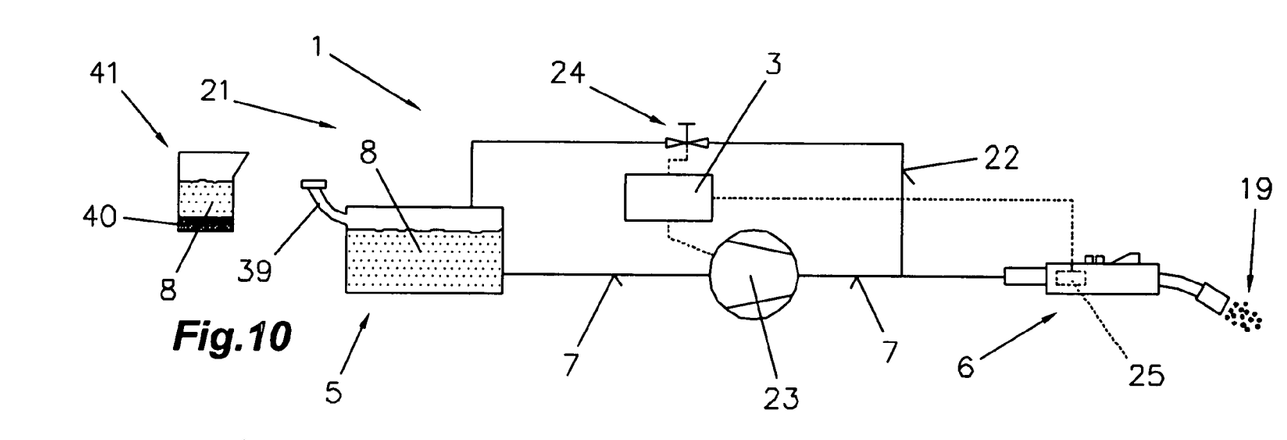

FIG. 10 depicts a further exemplary embodiment of the steam cutting device 1 according to the invention, comprising the fluid recirculation 21, by which the fluid 8 is delivered by a pump 23 from the container 5 to the burner 6 via the supply line 7. The pump 23 can be controlled by the control device 3 in a manner as to provide the pressure required for the steam cutting procedure in the burner 6 and in the supply line 7. The actual pressure can again be detected by a sensor 25 and transmitted to the control device 3.

The fluid 8 may, for instance, be comprised of tap water, wherein, however, filtering is suitable to remove impurities, which might soil or calcify the burner 6, the supply line 7 and the pump 23. This can be accomplished by the aid of an external filter 40 arranged, for instance, in a refill container 41, through which the fluid 8 is filtered prior to being filled into the container 5. Moreover, a filler neck 39 is, for instance, provided in the container 5, via which fluid 8 can be refilled.

In order to obtain relief of the steam cutting-device 1 and of the burner 6 and supply line 7, a relief line 22 is arranged between the burner 6 and the pump 23. In the relief line 22, a control valve 24 which is controlled by the control device 3 is, furthermore, arranged. Upon termination of the steam cutting procedure, the burner 6 and the supply line 7 can, thus, be relieved via the relief line 22 and the control valve 24. It is, moreover, also possible to control the pressure balance in the burner 6 and in the supply line 7 during the steam cutting procedure via the control valve 24. This may again be effected in that the sensor 25 takes up the current pressure values, transmits them to the control device 3, and the control device 3 controls the control valve 24 as a function of the desired pressure values. At too high a pressure in the burner 6 and in the supply line 7, the control valve 24 is being opened until the pressure values correspond with the required pressure values.

The fluid 8 can again be recirculated into the container 5 via the relief lines 22 in a simple manner, since the necessary operating pressure will be built up in the supply line 7 only downstream of the pump 23.

In order to provide a user-friendly operation and also refill option, it is, of course, also feasible to arrange the filter 40 in the container 5 and/or in the supply line 7 and/or in the relief line 22 and/or shortly upstream of the burner 6.

Figure 11:
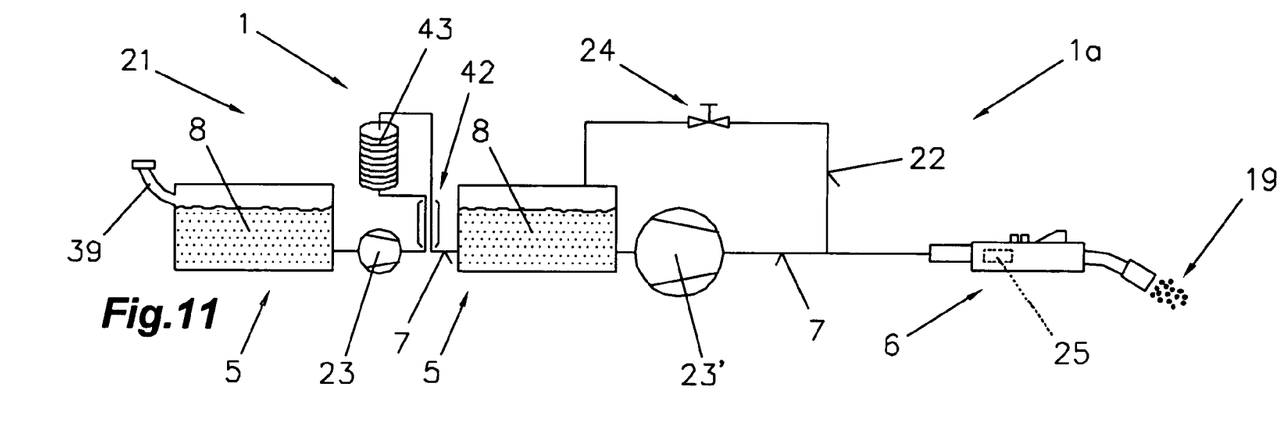

Another configuration option of the steam cutting device 1 according to the invention comprising the fluid recirculation 21 is schematically illustrated in FIG. 11. From the container 5 including a filler neck 39 arranged on the same, the fluid 8 is supplied to an evaporator 42 via the supply line 7 and the pump 23 arranged therein. The fluid 8 is distilled, i.e. heated to boiling temperature, in the evaporator 42 and delivered from the evaporator 42 into the supply line 7 in the thus resulting gaseous state. Following the evaporator 42, a countercurrent cooler 43 is arranged in the supply line 7, which causes the fluid 8 being in the gaseous state to cool down again and, hence, reassume its liquid state. Following the countercurrent cooler 43, the fluid 8 is transported into a further container 5, from which the fluid 8 is fed to the burner 6 via the further pump 23'.

Relief is again effected by a relief line 22 arranged between the burner 6 and the further pump 23'. A control valve 24 is arranged in the relief line 22 to control both the relief and the pressure balance. The fluid 8 is again recirculated into the further container 5.

With this configuration of the steam cutting device 1 according to the invention, it is, of course, again possible to provide a sensor 25 and control the pressure in the burner 6 and in the supply line 7 via the same. The pressure values detected by the sensor 25 are transmitted to the control device 3 so as to allow the pump 23 and/or the control valve 24 and/or the check valve 26 and/or the flow resistor 27 and/or the pressure reducer 28 to be controlled as a function of said values. Thereby, the automatic adaptation of the pressure is feasible during the steam cutting procedure, and the safe and rapid relief of the steam cutting device is ensured after the steam cutting procedure.

Measuring instruments for detecting the respective filling level may also be arranged in the container 5 and/or container 34 and/or pressure container 35. This allows for the timely detection of a lack of fluid 8 and the appropriate reaction to it.

The individual configurations represented in FIGS. 1 to 11 may either constitute autonomous solutions according to the invention and/or be combined with one another. The respective objects and solutions according to the invention can be taken from the detailed descriptions of these Figures.

The invention claimed is:

1. A steam cutting device comprising:
a container for a fluid;
a burner comprising a nozzle, the burner being connected with the container and being located downstream from the container;
a supply line connecting the container to the burner;
a current source connected to the burner, the current source providing electrical energy to the burner through a connection of the current source to the burner;
a control device connected to at least one of the container and the current source, the control device being able to control at least one of a flow of the fluid from the container to the burner and a flow of electrical energy from the current source to the burner, wherein fluid sent from the container to the burner via the supply line is burned by the burner to generate steam, and wherein said steam emerges from the nozzle of the burner as a steam jet; and
a relief line communicating with the supply line, the relief line being located upstream from the container, wherein the relief line can relieve pressure from at least one of the supply line and the burner by carrying out at least one of excess fluid of the supply line, excess fluid of the burner, and excess gas formed in the burner at or after completion of a steam cutting procedure performed by the steam cutting device, and wherein the cross section of the relief line is larger than the cross section of the supply line.

2. The steam cutting device according to claim 1, wherein the relief line is connected with the supply line within the burner or in the region of the burner.

3. The steam cutting device according to claim 1, wherein the cross section of the relief line is larger than the cross section of the nozzle outlet opening in the burner.

4. The steam cutting device according to claim 1, wherein a pump for building up the fluid operating pressure required in the burner and in the supply line facing the burner is arranged in the supply line.

5. The steam cutting device according to claim 1, wherein a check valve is arranged in the relief line.

6. The steam cutting device according to claim 1, wherein a control valve for controlling the pressure in the burner and/or in the supply line as well as the relief of the supply line is arranged in the relief line.

7. The steam cutting device according to claim 1, wherein a flow resistor is arranged in the relief line.

8. The steam cutting device according to claim 1, wherein a pressure reducer for reducing the pressure of the fluid to a desired operating pressure is provided.

9. The steam cutting device according to claim 4, wherein the pump is configured to deliver the fluid in two flow directions, namely in the direction of the burner and in the opposite direction.

10. The steam cutting device according to claim 1, wherein the relief line is connected with the container in a manner that, upon relief, the fluid is recirculatable into the container via the relief line.

11. The steam cutting device according to claim 1, wherein the container is formed by a gas bottle or gas cartridge.

12. The steam cutting device according to claim 1, wherein a predefined pressure is built up in the container.

13. The steam cutting device according to claim 1, wherein a nonreturn valve is arranged in the supply line.

14. The steam cutting device according to claim 1, wherein a nonreturn valve is arranged in the relief line.

15. The steam cutting device according to claim 13, wherein the nonreturn valve arranged in the supply line is designed to open at a pressure of from 0.01 bar to 10 bar, in particular 1 bar.

16. The steam cutting device according to claim 13, wherein the nonreturn valve arranged in the relief line is designed to open at a pressure of from 1 mbar to 1000 mbar, in particular 50 mbar.

17. The steam cutting device according to claim 1, wherein the fluid comprises water.

18. The steam cutting device according to claim 1, wherein a filter for cleaning the fluid is arranged in the container and/or in the supply line and/or in the relief line and/or in a refill container.

19. The steam cutting device according to claim 1, wherein a sensor for detecting the pressure in the burner and/or in the supply line and/or in the relief line is provided.

20. The steam cutting device according to claim 19, wherein the sensor is connected with the control device.

21. The steam cutting device according to claim 20, wherein the control device is connected with at least one of a pump, a control valve, a check valve, a flow resistor, and a pressure reducer for a pressure-dependent control.

22. The steam cutting device according to claim 1, wherein an evaporator is installed in the supply line.

23. The steam cutting device according to claim 1, wherein a means for detecting and processing the operating parameters of the steam cutting device is provided.

* * * * *